United States Patent [19]

Lye

[11] 4,063,301

[45] Dec. 13, 1977

[54] HALF-WAVE DETECTOR FOR ALTERNATING CURRENT STATIC SWITCHES

[75] Inventor: Ronald William Lye, Peterborough, Canada

[73] Assignee: General Electric Company, Philadelphia, Pa.

[21] Appl. No.: 712,990

[22] Filed: Aug. 9, 1976

[30] Foreign Application Priority Data

Aug. 25, 1975 Canada .................................. 234324

[51] Int. Cl.$^2$ ............................................ H02H 3/26
[52] U.S. Cl. ...................................... 361/88; 323/24; 323/119; 363/54
[58] Field of Search .......................... 361/18, 88, 187; 323/24, 119; 321/11, 12

[56] References Cited

U.S. PATENT DOCUMENTS

| 3,646,398 | 2/1972 | Kotos .................................. 321/12 X |
| 4,001,671 | 1/1977 | Gyugyi et al. ........................ 323/119 |

Primary Examiner—Harry E. Moose, Jr.
Attorney, Agent, or Firm—William Freedman

[57] ABSTRACT

A circuit for monitoring conduction of a phase controlled, alternating current switch, e.g., a thyristor switch, looks at the voltage across the switch. This voltage has a high dv/dt whenever the switch stops and starts conducting current. The voltage detected from across the switch is processed as follows: it is differentiated to produce a train of voltage spikes of very short time duration and some lesser voltages; the lesser voltages are removed; the spikes are then amplified and extended in time duration; and finally the time extended spikes are integrated. The integrated voltage is a train of alternate positive and negative voltages averaging zero during normal switch operation. However, when the switch conducts one of the half cycles only, the integrated voltage rises in one polarity sense depending upon the half cycle conducted. A control circuit becomes operative upon the integrated voltage attaining a predetermined value to initiate a control function such as de-energize the switch.

10 Claims, 3 Drawing Figures

HALF-WAVE DETECTOR FOR ALTERNATING CURRENT STATIC SWITCHES

This invention relates to a circuit for monitoring conduction of phase controlled, alternating current switching devices.

Phase controlled, alternating current switching devices are now well known. Examples of such devices are mercury arc rectifiers, thyratrons, thyristors and other solid state switches. There are some circuits using these devices where it is necessary to know if a device is conducting once gated on. The so-called "Static Var Controller" is an example of a circuit containing thyristors which are phase controlled and where conduction should be detected. A static var controller is a circuit used for controlling volt-amperes in an alternating current power system. It is, in essence, a circuit containing a fixed amount of inductance and capacitance, in which the combined reactive effect is controlled by varying the portion of each half-cycle of alternating current applied to the inductance. A convenient way of controlling these half-cycles of current is through the use of phase controlled thyristors operated in the mode of AC switches. Since the thyristors conduct all of a part or each positive and negative half-cycle, the resulting waveform is a series of alternating positive and negative pulses which may be full half-cycles or something less depending upon phase control. It is essential that the thyristor switch conduct on every half cycle, otherwise a DC component appears in the waveform. A DC component tends to saturate the supply transformer and generates even harmonics in the power system. If tolerated, this can cause failure of some power components.

The thyristor switch which controls the current to the reactor has a positive polarity and a negative polarity. Due to a malfunction of some part of the thyristor switch, most probably in the gating circuit, one of the two polarities could cease to function. This would cause a "half-wave" situation. Therefore it is necessary to monitor the reactor current to detect half-waving and to trip the equipment off the power system to protect both the system and the equipment. It is not easy to monitor the current directly because the voltages and currents are high. If current transformers are used, a DC component appearing in the primary current is not reproduced in the secondary current.

A half-wave detector according to this invention avoids the DC component problem by observing voltages across the thyristor switch. The voltage observed across a switch comes from an ordinary potential transformer having its primary connected across the switch and its secondary to the detector. The potential transformer also provides isolation from the high voltage on the reactor, typically 13,800 volts, and reduces the detector voltage to 115 volts R.M.S. while keeping the same waveform. Phase control of a thyristor switch results in a high rate of change of voltage with respect to time at the beginning and end of each voltage half-wave form, i.e., a high dv/dt whenever the switch begins to conduct current and again whenever the switch stops conducting current. In essence, the detector makes use of these high dv/dt's in carrying out its function of detecting conduction of the half-wave currents by the switch.

The detector is a circuit made up of a number of components, some of which are essential to the detecting function and the others help to improve its practical form. A differentiator responsive mainly to the high rate of change of voltage with respect to time appearing at the beginning and end of the voltage half-wave forms puts out a pulse of very short time duration for each such voltage change. These are discrete pulses except for spurious near zero voltages. A threshold circuit then removes the spurious low voltages from the differentiator pulses so that the discrete pulses only will be further processed. Next, an amplifier amplifies the pulses; a signal extender then extends the time duration of the amplified pulses; an integrator then integrates the extended pulses and finally an integrator output of a predetermined abnormally high value is used to carry out a control function. As long as the switch is conducting both half-cycles of the alternating current, the integrator output remains a series of alternate positive and negative pulses which average out to zero. However, should the switch fail to conduct either the positive or negative half-cycles, the integrator output voltage builds up in one polarity direction to the aforesaid abnormally high value where the control function is initiated. In the preferred detector circuit, the abnormally high voltage put out by the integrator in response to a switch malfunction will be rectified and applied to a relay driver, and a relay will initiate the control function. Moreover, in the preferred circuit, a buffer will be placed between the secondary of the potential transformer and the differentiator to reduce the transformer voltage and isolate the differentiator and the components following it from the transformer.

A preferred embodiment of the invention will now be described with reference to the drawings, in which.

Figure 1:
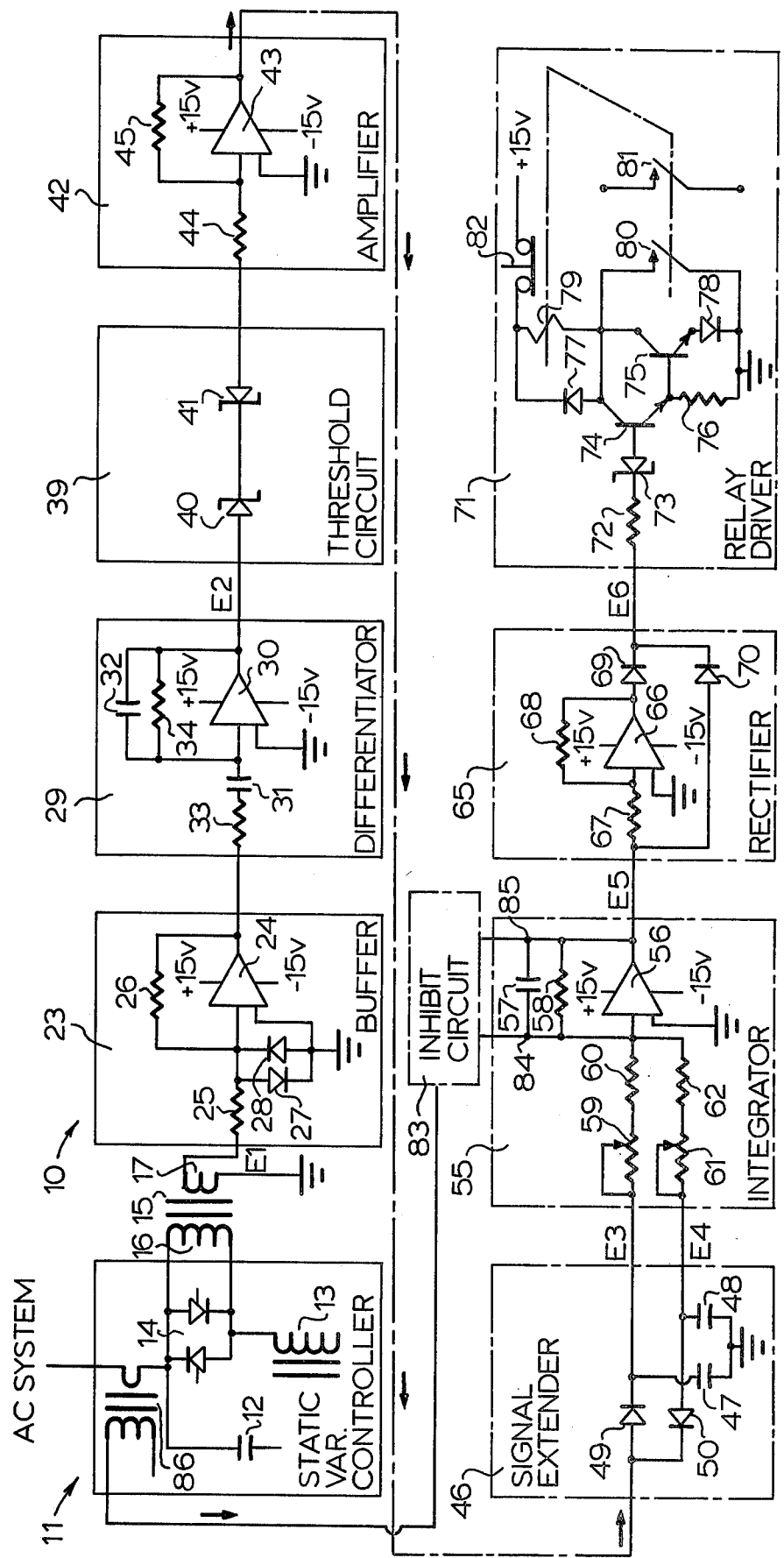
FIG. 1 is a circuit diagram of the detector.

A circuit of the half-wave detector is shown at 10 in FIG. 1 connected to a static var controller 11. Controller 11 is shown schematically with a capacitor 12, a reactor 13 and two thyristors to represent the capacitance, inductance and thyristor switch 14 respectively. The thyristors are connected to operate as a phase controlled AC switch. Although only two thyristors are shown connected in parallel, the series-parallel combination used will depend on the current and voltage. Switch 14 conducts a portion of each half-cycle of alternating current supplied to reactor 13 and in this way controls the inductive component of the reactance of the controler. Controller 11 and its mode of operation are known in the art.

Figure 2:
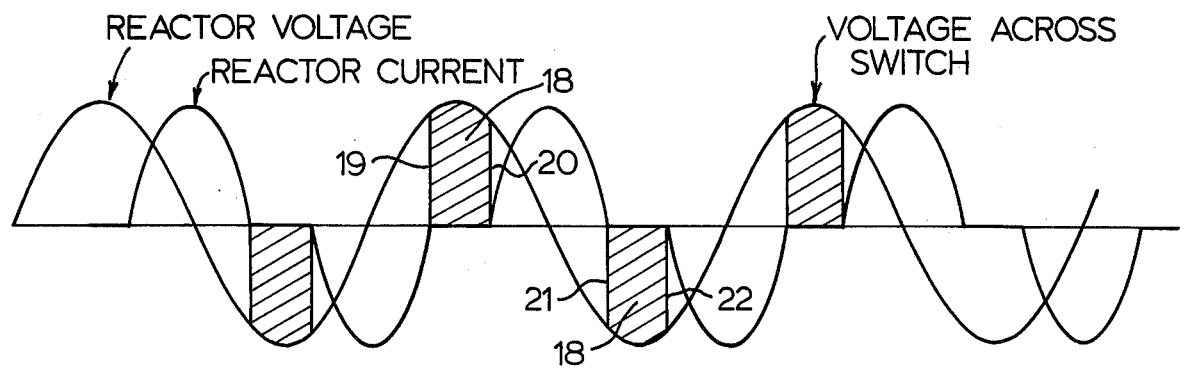
FIG. 2 illustrates the current and voltage waveforms in the reactor of a static var controller.

The purpose of circuit 10 is to monitor conduction of switch 14. This is done by looking at the voltage waveforms across the switch. The voltage and current waveforms appearing in reactor 13 and switch 14 are illustrated in a general way in FIG. 2 so as to emphasize the nature of the voltage waveforms 18 across the switch whenever the switch is not conducting. It is to be noted that each waveform 18 has a very steep voltage rise 19 when conduction stops and a very steep fall 20 when conduction starts, i.e., high dv/dt's. A potential transformer 15 has its primary winding 16 connected across switch 14 and its secondary winding 17 connected to the input of circuit 10. The voltage input E1 put into circuit 10 is a diminished version of the voltage appearing across the switch, typically 115 volts R.M.S. and about 162 volts peak.

A buffer 23 composed of an operational amplifier 24 and the two resistors 25 and 26 reduces the voltage E1 to a value in the order of ten volts peak and isolates the components of the detector from the secondary winding 17 of transformer 15. Components 24 to 26 are connected in a known amplifier configuration with the values of the resistors selected for voltage dropping. Diodes 27 and 28 provide transient protection for the operational amplifier.

The output of buffer 23 is applied to the input of a conventional differentiator 29 consisting of an operational amplifier 30, capacitors 31 and 32, and resistors 33 and 34. This differentiator responds mainly to high dv/dt's; its output is very low if the input voltage is not changing rapidly. Because the input to the differentiator has very rapid changes in voltage at 19 to 22, the differentiator puts out four discrete voltages 35 to 38 of very short time duration for each cycle of voltage E1 as shown at E2 in FIG. 3, the changes 19 to 22 producing the voltage spikes 35 to 38 respectively. These spikes or slender waveforms do not start and stop at zero but include some intervening lower voltages produced by medium dv/dt inputs.

The intervening voltages are removed from voltage E2 by means of a threshold circuit 39. Circuit 39 contains two zener diodes 40 and 41 which pass only voltages somewhat in excess of the maximum values of the intervening voltages. This then eliminates the intervening voltages and thereby renders the detector insensitive to small signals produced by medium dv/dt inputs.

Since the signal has thus been reduced drastically, i.e., by about 6.8 volts peak, it is then amplified by a factor of eight in amplifier 42. Amplifier 42 is a conventional amplifier composed of an operational amplifier 43 and two resistors 44 and 45 having a ratio of resistance of eight to one. The output of the amplifier will be essentially the voltage waveforms shown at E2 in FIG. 3.

The output from amplifier 42 is put into a signal extender 46 consisting of two capacitors 47, 48 and two diodes 49, 50. The diodes direct the positive and negative pulses into the respective capacitors, where they are stored a short time. Charging and discharging of the capacitors has the effect of lengthening the time duration of the pulses 35 to 38 and reshaping them into the waveforms 51 to 54 shown at E3 and E4 in FIG. 3. Since the E2 pulses are of such short time duration, it is impractical to integrate them without time extension.

Voltages E3 and E4 are now applied to the input of integrator 55. This is a known integrator consisting of an operational amplifier 56, a capacitor 57, and five resistors 58 to 62. A series of positive pulses into the operational amplifier causes its output to ramp down (go negative) as indicated at 63 in voltage E5 of FIG. 3 while a series of negative pulses cause its output to ramp up (go positive) as indicated at 64 in voltage E5. As long as the positive and negative pulses are equal, the average output of the operational amplifier will be zero, otherwise its output will gradually increase either positively or negatively to a value that will cause operation of the detector, in this particular case 12 volts. Resistors 59 and 61 are adjustable so they can be used for proportioning the positive and negative inputs to the operational amplifier for a balanced output thereof.

Figure 3:
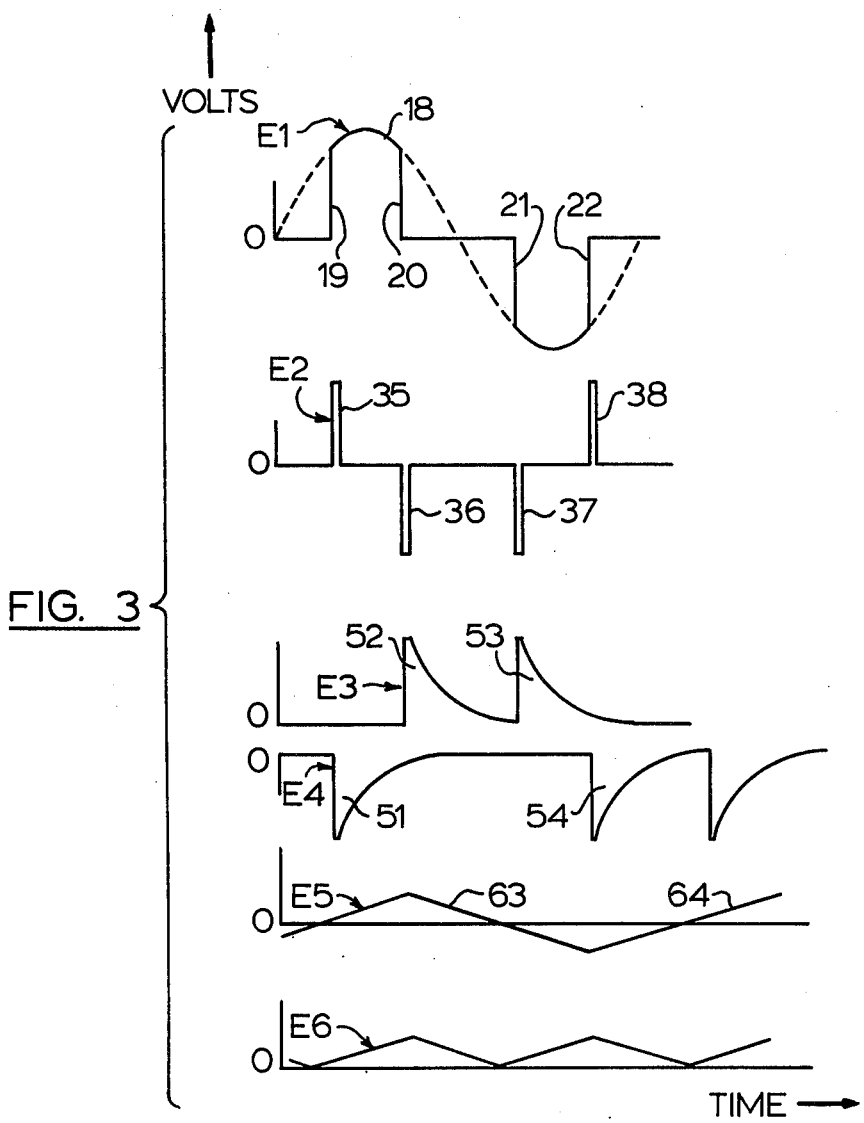
FIG. 3 illustrates the waveform appearing in the detector circuit of FIG. 1.

The output of integrator 55 is connected to the input of a rectifier 65. The rectifier consists of an operational amplifier 66, two resistors 67 and 68, and two diodes 69 and 70. Components 66 to 68 are connected in the configuration of a conventional amplifier with the resistors equal in value so there is no signal amplification, only signal inversion. Hence a negative input to rectifier 65 is inverted and conducted by diode 69 while a positive input is conducted directly by diode 70. Therefore, either a positive or a negative output from integrator 55 appears as a positive input E6 to the relay driver 71. Voltage E6 is shown in FIG. 3 as a rectified version of voltage E5, these being the voltage patterns during normal operation of switch 14.

Relay driver 71 consists of a resistor 72, a zener diode 73, transistors 74, 75, resistor 76, diodes 77, 78, coil 79 of a relay having normally open contacts 80 and 81, and a pushbutton 82. Resistor 72 limits the input current and zener diode 73 keeps voltages below a certain value off the base of transistor 74, thus stopping the relay from operating on trivial outputs from the rectifier stage. Transistors 74 and 75 along with resistor 76 form an amplifier circuit for energizing relay coil 79 for closing its normally open contacts 80 and 81. Diodes 77 and 78 protect the transistors against transients in the relay circuit. Pushbutton 82 has normally closed contacts and its purpose is to de-energize relay coil 79 to reset the circuit after a trip.

In the event that thyristor switch 14 fails to conduct one or the other of the alternating current half-waves for a predetermined duration, the voltage E6 builds up to a positive level, i.e., 10 volts, where it breaks over zener diode 73 and applies a positive bias to the base of transistor 74. This causes the amplifier to energize relay coil 79 so that it closes contacts 80 and 81. The closing of contact 80 seals-in the relay and the closing of contact 81 initiates a control function such as disconnecting the thyristor switch from the AC system. Once the fault has been corrected and normal operation of the switch restored, pushbutton 82 is depressed long enough to de-energize relay coil 79, thus restoring operation of detector 10.

Using phase control, the current in the thyristor switch can be varied from zero to a maximum. When the current is nearly zero and when it is at a maximum the half-wave detector described may not operate correctly. At very low current, the voltage 19, 20, 21, 22 in FIG. 3 become very low and at some point will be too low to operate the detector. Since the voltages 19 and 22 will not reach this point, simultaneously with voltages 20 and 21, a false detection of a half-wave situation can result. Similarly as current approaches maximum there will be a point where voltages 19, 20, 21, 22 disappear. Since they may not disappear simultaneously and may be distorted just before disappearance, a false detection could result. To avoid these possible false detections "dead bands" may be provided, as a function of current magnitude, which inhibit operation of the detector. Typically current signals of from 0 to 5% and from 95 to 100% of the maximum would energize means to short circuit the integrator. This short circuit means could be a relay contact or a semi-conductor such as a field effect transistor (FET). At currents from about 0-5% a half-wave situation does not matter. At currents of 95% or more, a half-wave situation will be detected by overcurrent devices elsewhere on the system. Therefore these dead bands can be tolerated.

In FIG. 1, an inhibit circuit is shown at 83 connected to points 84 and 85 of integrator 55 and energized from a current transformer 86 in the AC system. During operation of the var controller outside the "dead ban" regions, the inhibit circuit maintains an open circuit between 84 and 85. However, during the abnormal conditions outlined in the previous paragraph, the inhibit circuit provides a short circuit path between points 84 and 85. This then inhibits operation of the integrator, and in so doing renders the detector inoperative.

The embodiments of the invention in which an exclusive property or privilege is claimed are defined as follows:

1. A circuit for monitoring conduction of a phase controlled, alternating current switching device comprising means for detecting the voltage across said switching device; a differentiator for differentiating said voltage to obtain a train of positive and negative voltage pulses of short time duration and other voltages of lesser peak values, each rapid change of said voltage in one direction producing a pulse of one polarity and each rapid change in the other direction producing a pulse of the other polarity; a threshold circuit for passing voltage pulses in excess of said lesser peak values; an amplifier for amplifying the voltage pulses passed by said threshold circuit; an extender circuit for lengthening the time duration of said amplified pulses; an integrator for integrating said time lengthened pulses and putting out alternate positive and negative voltages averaging zero in value during normal operation of said switching device and during abnormal operation when the switching device conducts half-waves of one polarity only putting out an incrasing voltage of one polarity only; and means responsive to a predetermined value of said increasing voltage for initiating a control function.

2. A circuit according to claim 1 wherein said control function initiating means comprises a pair of rectifiers connected in parallel in the same polarity sense between the output of said integrator and a relay driver; an inverter connected between one of said rectifiers and said integrator output; and a relay operated by said driver.

3. A circuit according to claim 2 wherein said relay is operative to de-energize said switching device upon said abnormal operation thereof.

4. A circuit according to claim 2 wherein said relay driver comprises means for blocking voltage below a predetermined value and an amplifier for amplifying the voltages let through the blocking means.

5. A circuit according to claim 1 wherein said voltage detecting means comprises a potential transformer having its primary winding connected across said switching device; and a buffer having its input connected to the secondary winding of said transformer and its output to the input of said differentiator.

6. A circuit according to claim 5 wherein said buffer includes means for reducing the voltage to said differentiator.

7. A circuit according to claim 1 wherein said extender circuit is a capacitor circuit.

8. A circuit for monitoring conduction of a phase controlled, alternating current switching device comprising a potential transformer having its primary winding connected across said switching device; a voltage reducing buffer having its input connected to the secondary winding of said potential transformer; a differentiator having its input connected to the output of said buffer; a threshold circuit having its input connected to the output of said differentiator; an amplifier having its input connected to the output of said threshold circuit; a signal extender having its input connected to the output of said amplifier; an integrator having its input connected to the output of said signal extender; a rectifier having its input connected to the output of said integrator; and a relay driver having its input connected to the output of said rectifier.

9. A circuit according to claim 8 wherein said switching device comprises a plurality of thyristors that are phase controlled to control current flow in a reactor in a static var controller.

10. A circuit according to claim 3 wherein said relay driver comprises means for blocking voltage below a predetermined value and an amplifier for ampliflying the voltages let through the blocking means.

* * * * *